March 7, 1967  V. C. VANDERBILT  3,308,360
FINE AND COARSE POSITION SERVO WITH FREQUENCY COMPARATORS
Filed July 25, 1962  5 Sheets-Sheet 2

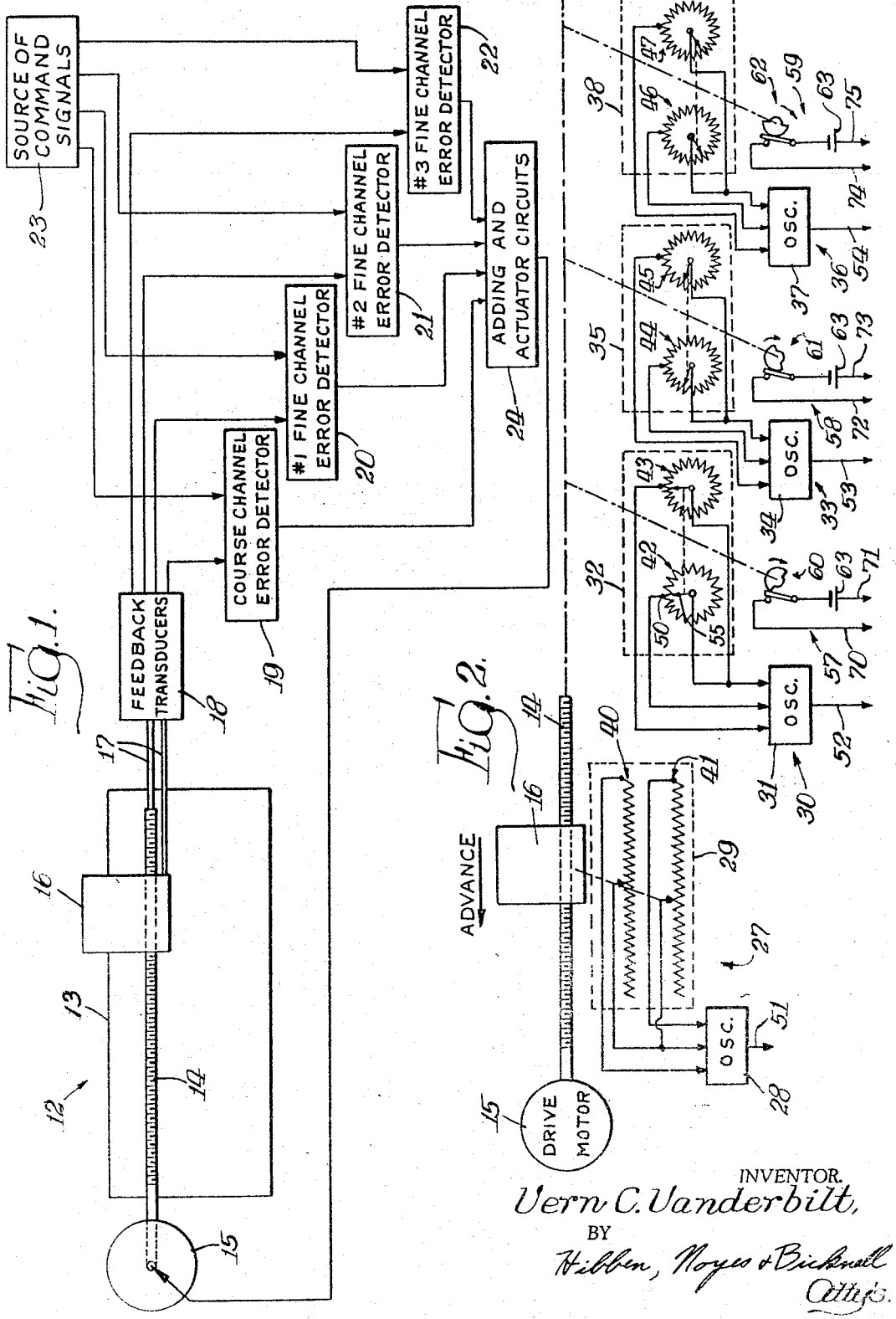

INVENTOR.
Vern C. Vanderbilt,
BY
Hibben, Noyes & Bicknell
Atty's.

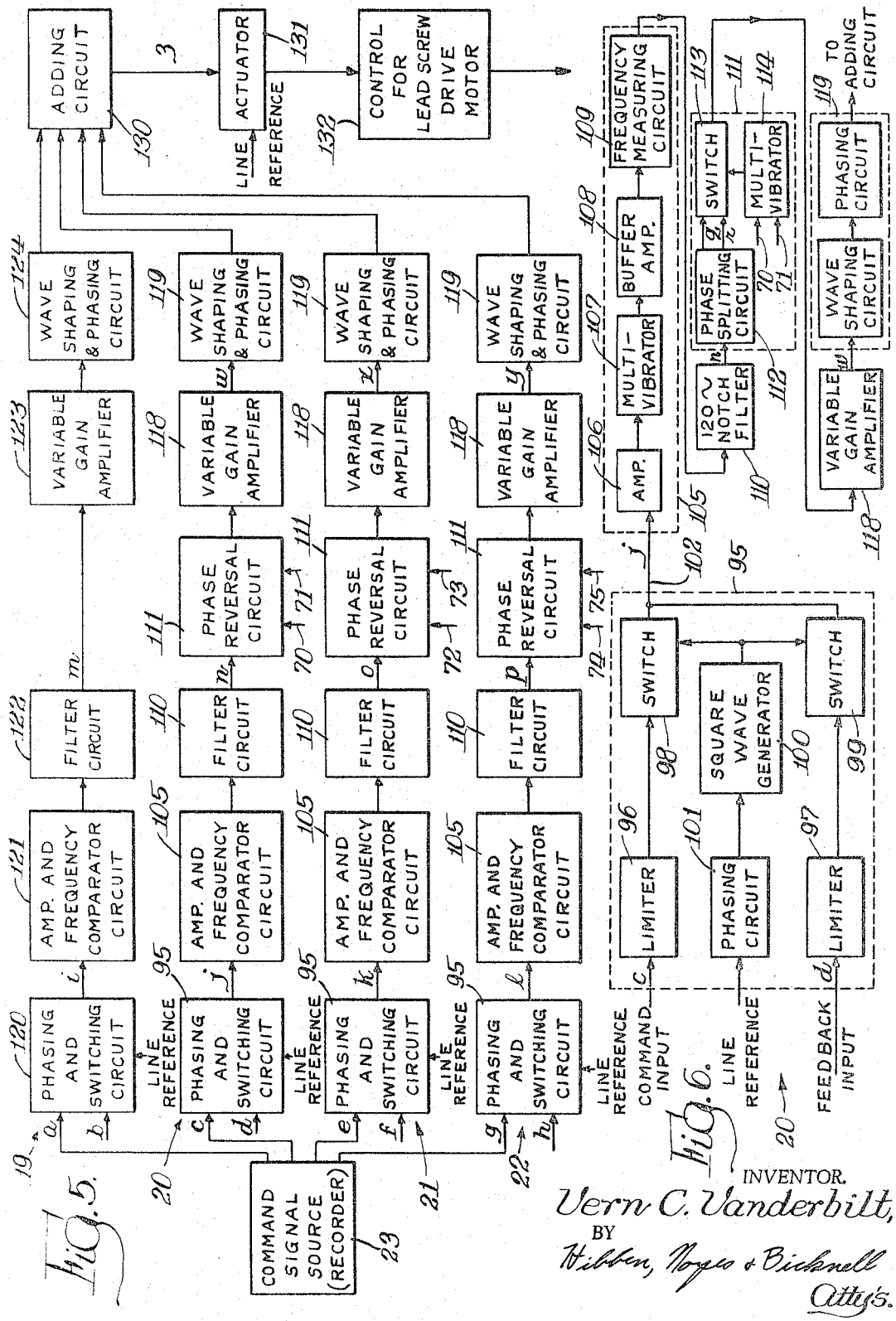

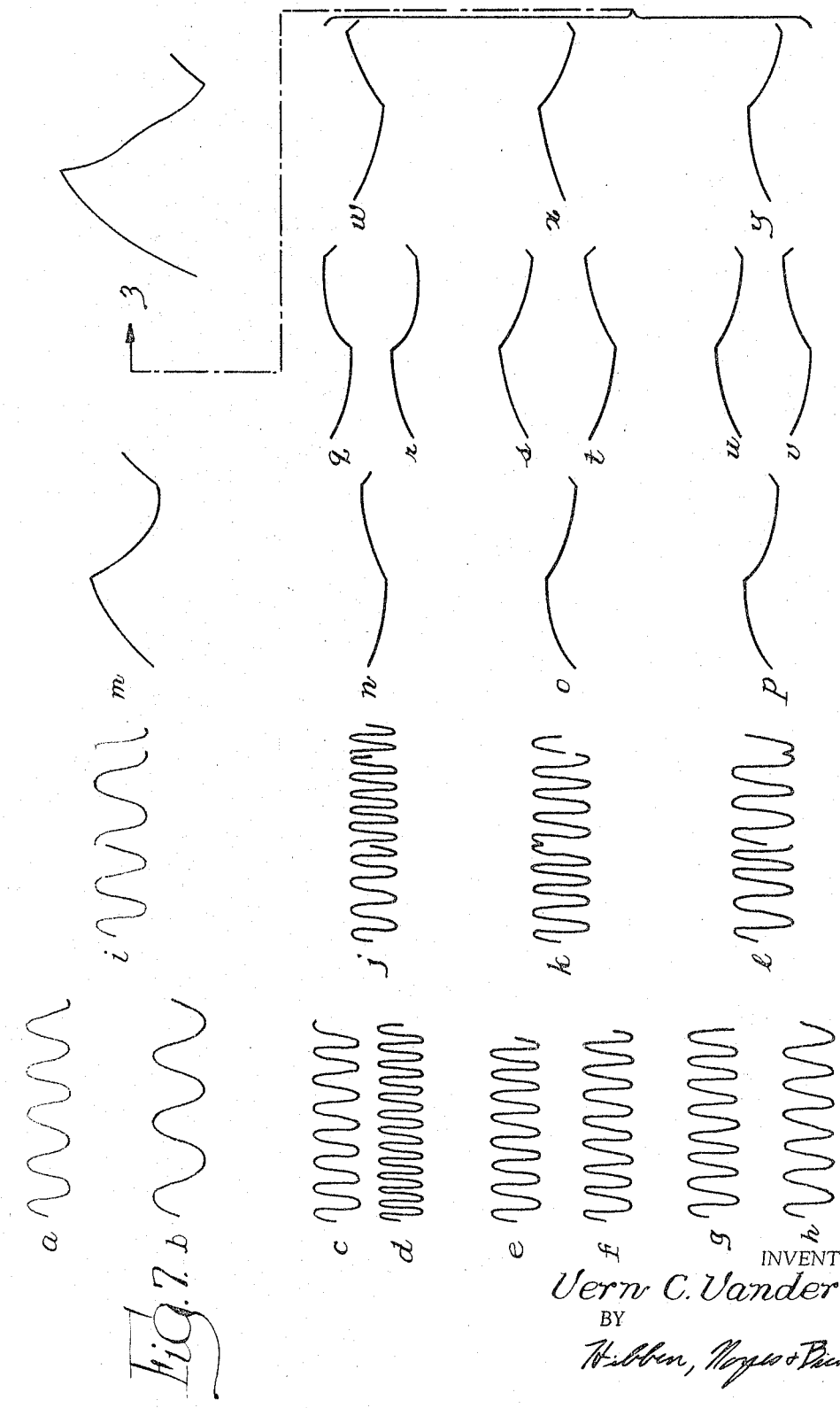

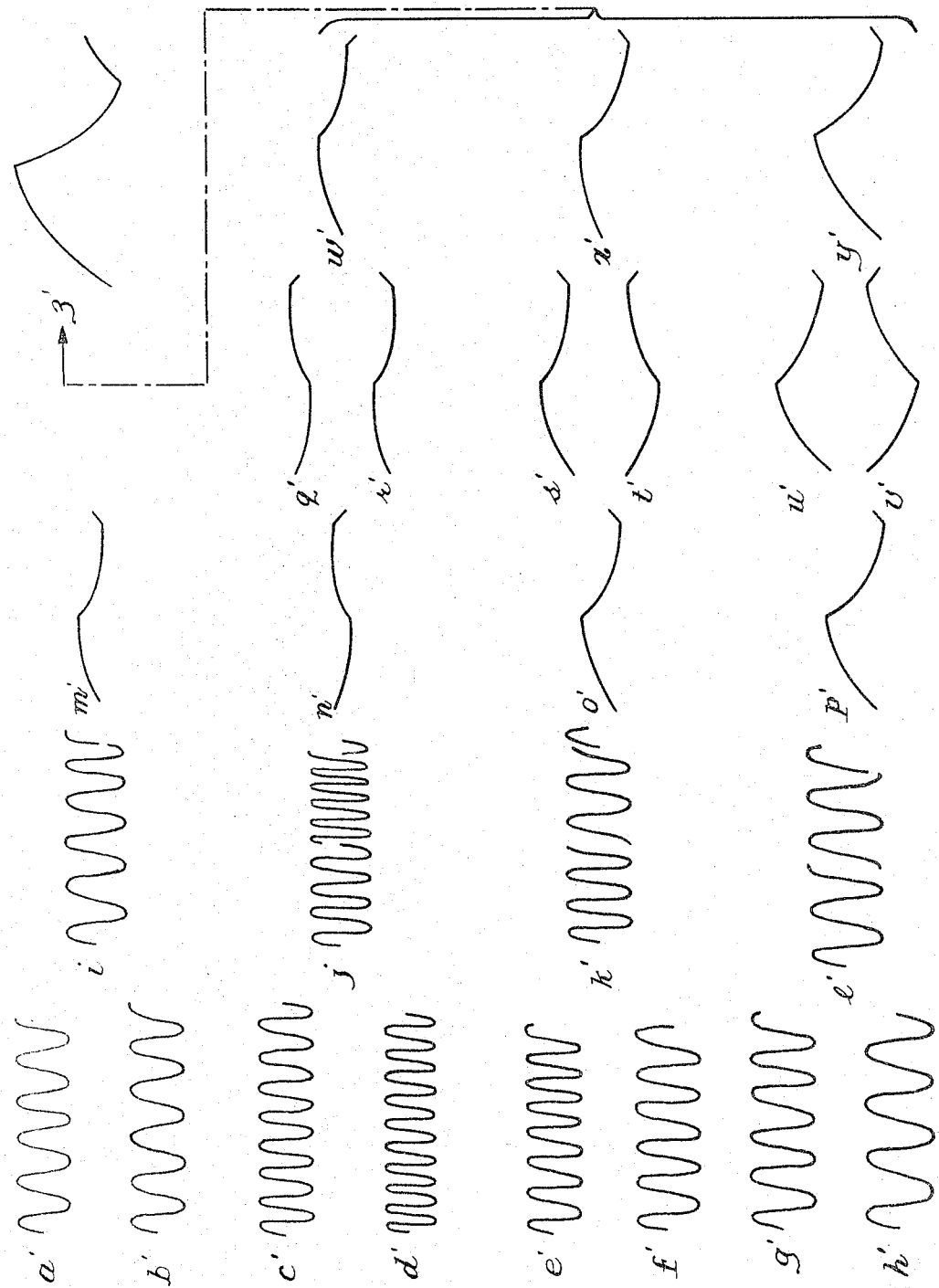

United States Patent Office 3,308,360
Patented Mar. 7, 1967

3,308,360
FINE AND COARSE POSITION SERVO WITH FREQUENCY COMPARATORS
Vern C. Vanderbilt, Hagerstown, Ind., assignor, by mesne assignments, to Dynamic Precision Control Corporation, Hagerstown, Ind., a corporation of Indiana
Filed July 25, 1962, Ser. No. 212,243
16 Claims. (Cl. 318—18)

This invention relates generally to control systems and, more particularly, to a system for controlling a variable parameter such as the position of a movable structure, for example, the carriage of a machine tool.

Programmed machine tool control systems now in general use employ a phase comparison method of operation. It has been recognized that a frequency comparison method of operation would work better because of the ease of handling the signal or signals and the ease of storing the signals on a magnetic tape. However, heretofore frequency comparison systems have not been satisfactory because the difficulty of accurate location of the structure over a large distance has not been adequately overcome.

Accordingly, it is the primary object of this invention to provide a novel machine tool control system employing a frequency comparison method of operation.

It is another object to provide a system of the foregoing character, which is capable of accurately positioning a structure over a relatively large distance in accordance with a prerecorded schedule.

Still another object is to provide a system of the foregoing character which includes novel position-to-frequency transducers.

Other objects and advantages of the invention will become apparent from the following detailed description taken in conjunction with the accompanying figures of the drawings, in which:

FIG. 1 is a schematic electrical diagram of a control system embodying the invention;

FIG. 2 is a more detailed schematic electrical diagram of a portion of the system shown in FIG. 1;

FIG. 5 is a block diagram of a portion of the system shown in FIG. 1;

FIG. 6 is a block diagram showing a portion of FIG. 5 in greater detail; and

FIGS. 7 and 8 are two schedules of waveforms illustrating the operation of the system.

Figure 4:
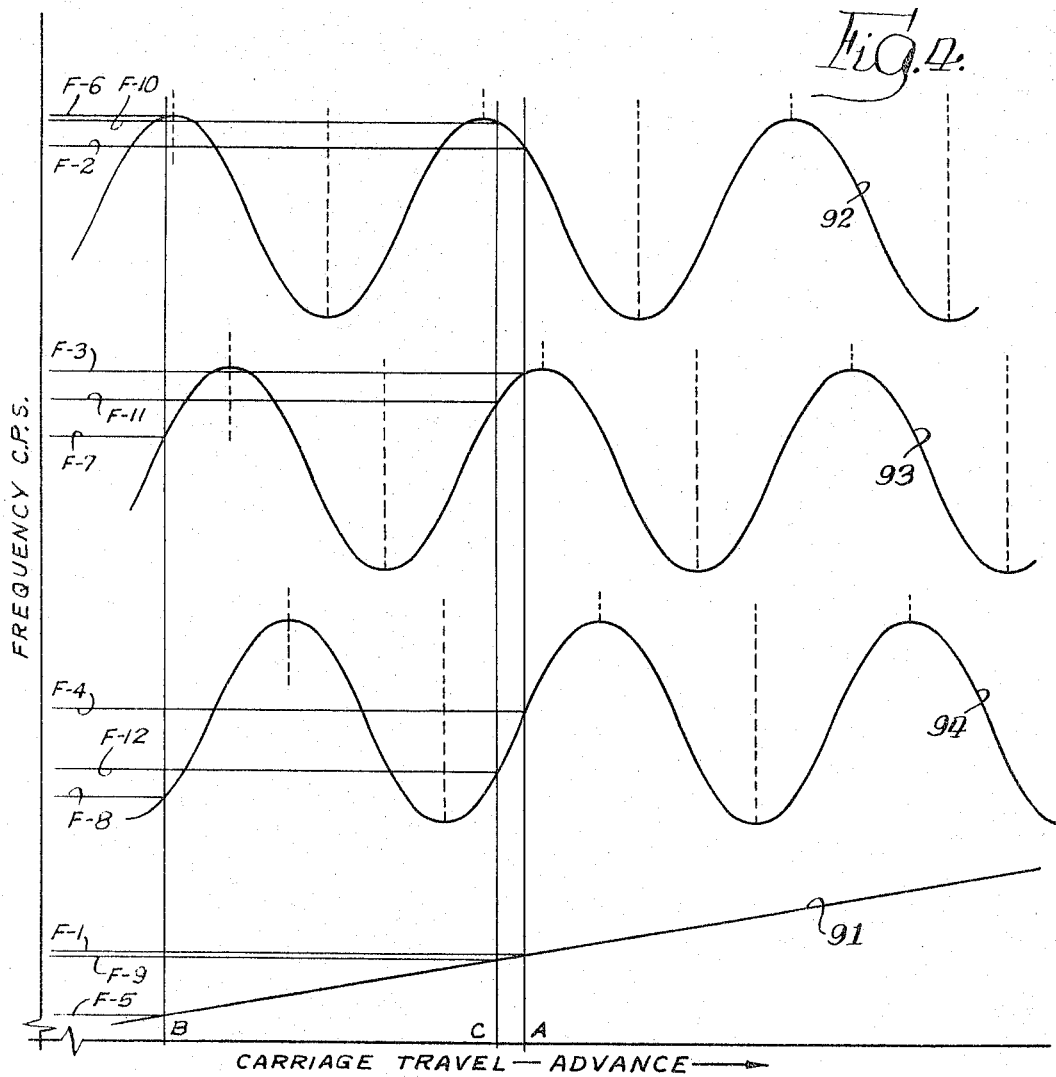
FIG. 4 shows curves which illustrate the operation of the system.

In general, a system embodying the invention is designed to control a variable parameter. The system described herein is designed to be used, for example, with a lathe, the variable parameter being the postion of the carriage of the lathe and the system being adapted to control or guide the movement of the carriage in accordance with a prerecorded program. The system comprises a coarse feedback transducer and at least one fine feedback transducer, each transducer being coupled to be responsive to the position of the carriage and adapted to generate an electrical signal the frequency of which varies as the position of the carriage varies. The frequency of the coarse feedback transducer is preferably a linear function of carriage position and the frequency of the fine transducer is preferably a mathematical function such as a sine wave of carriage position.

The feedback frequency for each transducer at a desired position of the carriage is determined and command signals having these frequencies are recorded. An error detector channel is connected to the output of each feedback transducer and to the output of the recorder. Each error detector channel compares the frequency of the feedback signal, which is representative of the actual position of the carriage, with that of the command signal, which is representative of the desired position of the carriage, and produces an error signal having a characteristic that is representative of the frequency difference between its two input signals. This comparison occurs simultaneously in all channels, and all error signals are combined to produce a resultant error signal. This latter signal energizes an actuator which is connected to vary the position of the carriage and move it toward the desired position. While the carriage is a considerable distance away from the desired position the coarse channel error signal is the controlling factor, but when the carriage approaches the desired position the fine channel error signal becomes predominant and moves the carriage exactly to the desired position.

Preferably, at least two fine feedback transducers and error detector channels are employed, in each of which the frequency is a sine wave function of position of the carriage. The maximum and minimum frequency points on the lathe bed for each fine channel are displaced from the corresponding frequency points for the other fine channels. Further, means is provided in each fine channel to make certain that its error signal combines properly when the carriage is close to the desired position.

In greater detail, FIG. 1 illustrates a lathe, indicated generally by the numeral 12, which includes a bed 13, a lead screw 14 and a suitable drive motor 15 for the lead screw. A carriage 16 is mounted on the bed 13 of the lathe and is adapted to be driven by the lead screw 14 and motor 15.

The control system includes a unit 18 containing four position-to-frequency feedback transducers, the transducers being coupled by suitable means such as linkages 17 to the lead screw 14 and the carriage 16 of the lathe. The output of each feedback transducer in the unit 18 is connected to an input of an error detector circuit. The numeral 19 indicates a coarse channel error detector circuit and the numeral 20, 21 and 22 indicate three fine channel error detector circuits. A source 23, such as a tape recorder, having a moving memory path and four outputs, feeds a command signal into each of the detector circuits 19 and 22 simultaneously with the feedback signals from the feedback transducers. Each error detector circuit is adapted to compare the frequencies of its two input signals and produce an error signal having a characteristic that is representative of the frequency difference. The outputs of the four error detector circuits 19 to 22 are fed into an adding and actuator circuit 24. The adding circuit combines the four error signals and produces a resultant error signal, and the actuator controls the drive motor 15 and causes the carriage 16 to move in such a manner as to eliminate the resultant error signal.

Figure 3:
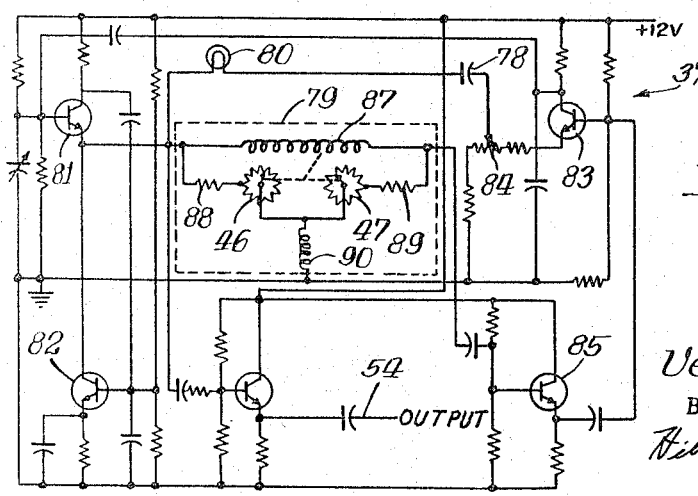
FIG. 3 is a schematic electrical diagram of a transducer of the system.

FIGS. 2 and 3 illustrate the four position-to-frequency transducers in the unit 18 in greater detail. Each transducer comprises a variable frequency resistance tuned oscillator and a tuning circuit. The feedback transducer indicated generally by a numeral 27, for the coarse channel error detector circuit 19, comprises an oscillator 28 and a tuning circuit 29; the transducer for the fine channel error detector circuit 20 is indicated generally by the numeral 30 and comprises an oscillator 31 and a tuning circuit 32; the transducer for the fine channel error detector circuit 21 is indicated generally by the numeral 33 and comprises an oscillator 34 and a tuning circuit 35; and the transducer for the fine channel error detector circuit 22 is indicated generally by the numeral 36 and includes an oscillator 37 and a tuning circuit 38.

The four tuning circuits 29, 32, 35 and 38 each comprises a pair of potentiometers, the tuning circuit 29 including potentiometers 40 and 41, the circuit 32 including potentiometers 42 and 43, the circuit 35 including potentiometers 44 and 45, and the circuit 38 including potentiometers 46 and 47. The wipers of the potentiometers 40 to 47 are coupled by the linkages 17, FIG. 1, to be driven by the carriage 16 and the lead screw 14 of the lathe, and the wiper and resistive element of each potentiometer is electrically connected into its associated oscillator circuit. The resistance of each potentiometer 40 and 41 of the coarse channel tuning circuit 29 preferably varies linearly with movement of the carriage 16, while the resistance of each potentiometer 42 to 47 of the three fine channel tuning circuits 32, 35 and 38 preferably varies as a sine wave function with rotation of the lead screw 14. To obtain a sine wave function, the ends of the resistive element of each potentiometer 42 to 47 are electrically connected to a terminal, indicated by the numeral 50, for the potentiometer 42 of the tuning circuit 32. Since the potentiometers 42 to 47 have similar constructions, only the potentiometer 42 will be described in detail. The resistive element of this potentiometer 42 is constructed such that the resistance measured between the terminal 50 and its wiper 55 is at a minimum when the wiper 55 is adjacent the terminal 50 as shown in FIG. 2, and the resistance gradually increases as the wiper is rotated and reaches a maximum when the wiper is diametrically opposed to the terminal 50. The resistance gradually decreases again as the wiper 55 is rotated farther toward the terminal 50. Since the wiper 55 and the terminal 50 are connected to the oscillator 31, it is apparent that the resistance as sensed by the oscillator will alternately increase and decrease, preferably as a sine wave as the lead screw 14 and the wiper 55 rotate. The construction and operation of the other potentiometers 43 to 47 is identical to that of the potentiometer 42, the only exception being that the wipers of the potentiometers 44 and 45 are displaced 60° behind the wipers of potentiometers 42 and 43, and the wipers of potentiometers 46 and 47 are displaced 120° behind the wipers of potentiometers 42 and 43. The output of the oscillators 28, 31, 34 and 37 are connected by conductors 51, 52, 53 and 54, respectively, to the circuits shown in FIGS. 5 and 6. The resistance of the oscillators could be varied by means other than potentiometers. For example, photo resistive semiconductors could be used to change the resistance of the oscillators. A light could be modulated by mirror with cam and lever links or with direct aperature control on the light source. While resistance tuning is preferred, inductor or capacitor tuning could also be used.

The unit 18 also contains three switching circuits 57, 58 and 59 which are associated with the feedback transducers 30, 33 and 36, respectively. Each circuit 57 to 59 contains a cam actuated switch rotatably mounted and connected to be driven by the lead screw 14 of the lathe. During one-half the revolution of each cam, the rise of the cam causes its associated pivotally mounted switch contact to close a circuit through a battery 63, and during the remaining one-half revolution the low portion of the cam permits the contacts to open. A spring (not shown) may be employed to urge each switch to its open condition. The three switching circuits 57 to 59 are identical with the exception that the cam element of the switch 60 is displaced 60° ahead of the cam element of the switch 61 and 120° ahead of the cam element of the switch 62, which is similar to the phase relationship between the wipers of the potentiometers 42 to 47. Two conductors 70 and 71 connect the switching circuit 57 to the circuit shown in FIGS. 5 and 6, conductors 72 and 73 connect the switching circuit 58 to the circuits of these two figures, and conductors 74 and 75 connect the switching circuit 59 to the circuits of these two figures.

FIG. 3 shows in detail the oscillator 37 and the tuning circuit 38 of the fine frequency channel transducer 36. This oscillator circuit uses both positive and negative feedback loops with a notch tuning network 79 as the frequency determining element. An incandescent lamp 80 in the forward loop gives amplitude stabilization. Two NPN transistors 81 and 82 form a grounded collector stage with an output impedance of approximately 50 ohms. The forward signal path is from the emitter of transistor 81, through the lamp 80 and a capacitor 78, to the emitter of another NPN transistor 83. A potentiometer 84 adjusts the forward gain and thus the oscillator amplitude. The forward loop is completed by a connection from the collector of transistor 83 to the base of transistor 81.

The negative feedback path consists of the notch tuning network 79 and a grounded collector transistor 85 stage, connected to the base of transistor 83. The input impedance of the stage being driven by the network 79 must be as high as possible so that the change in input impedance with temperature change does not cause a significant change in loading of the network. Further, the impedance of the notch network 79 does not remain constant because the frequency is controlled by changing resistance. Therefore, substantially eliminating changes in the loading of the network 79 prevents serious amplitude variations as the oscillator is modulated.

The notch tuning network 79 for the oscillator circuit 37 comprises an inductor 87, two fixed resistors 88 and 89 and the two potentiometers 46 and 47 connected across the inductor 87, and an inductor 90 connected between the wipers of the two potentiometers 46 and 47 and ground potential. The frequency in cycles per second of the tuning network 79 is given by the equation:

$$f = \frac{1}{2\pi}\sqrt{\frac{(R_1+R_2)(R_3+R_4)}{L_1 L_2}} \qquad (1)$$

where
$R_1$ is the resistance in ohms of resistor 88;
$R_2$ is the resistance in ohms of resistor 46;
$R_3$ is the resistance in ohms of resistor 47;
$R_4$ is the resistance in ohms of resistor 89;
$L_1$ is the inductance in henrys of inductor 87; and
$L_2$ is the inductance in henrys of inductor 90.

If $R_1=R_4$ and $R_2=R_3$, Equation 1 may be written:

$$f = \frac{1}{2\pi}\sqrt{\frac{(R_1+R_2)(R_2+R_1)}{L_1 L_2}} \qquad (2)$$

$$= \frac{R_1+R_3}{2\pi\sqrt{L_1 L_2}} \qquad (3)$$

If $L_2$ and $L_2$ are held constant, then $$f = K(R'+R_2) \qquad (4)$$

It is apparent from Equation 4 that the frequency of the tuning network 79 and the output signal of the ocillator 37 varies directly with the value of the resistors 88 and 46 which are equal to resistors 89 and 47, respectively. Since resistors 88 and 89 are fixed, the frequency of each tuning network varies with the resistance of its potentiometers. The resistance of the potentiometers 40 and 41 for the course channel transducer varies linearly with carriage travel along the lathe bed. Therefore, frequency is a linear function of bed travel for the coarse channel, as indicated by curve 91, FIG. 4. The resistance of each potentiometer in the tuning networks 32, 35 and 38 of the fine frequency channels varies sinusoidally with rotation of the lead screw as previously explained, so that the frequency of each fine channel transducer also varies as a sine wave. In FIG. 4, the curves for the transducers 30, 33 and 36, associated with the fine channels 20, 21 and 22, are indicated by the numerals 92, 93 and 94, respectively. Since the wipers of the potentiometers 42 and 43 are displaced 60° ahead of those for the potentiometers 44 and 45 and 120° ahead of those for the potentiometers 46 and 47, the maximum and minimum frequency positions of the curve 92 are corresponding displaced 60° and 120° ahead of those for the curves 93 and 94, respectively. The reason for these phase differences will be discussed subsequently. Other than differences in the values of some of these components to accommodate different frequency ranges, the four oscillators 28, 31, 34 and 37 of the transducers may be identical. The desired bandwidth or frequency range of each transducer may be obtained by a proper selection of the tuning network 79 constants, such as the resistors 88 and 89.

From FIG. 4 it can be seen that each position of the carriage on the bed of the lathe is associated with a set of four frequencies. For example, carriage position A is associated with frequencies F–1, F–2, F–3 and F–4, and position B is associated with frequencies F–5, F–6, F–7 and F–8. Assume that it is desired to position the carriage at position A and that command signals having frequencies F–1, F–2, F–3 and F–4 have been recorded on a suitable medium such as a magnetic tape. Assume also that the carriage is actually at position B and the oscillators 28, 31, 34 and 37 are producing feedback signals having frequencies F–5, F–6, F–7 and F–8, respectively. The four error detector channels 19 to 22 are designed to combine these command and feedback signals and produce a resultant error signal that causes the lead screw drive motor 15 to move the carriage to position A.

FIG. 5 illustrates in block diagram form the four channels 19 to 22 and the adding and actuator circuits. FIG. 6 illustrates in greater detail fine channel 20, and FIG. 7 is a schedule of waveforms employed to illustrate the operation of the system in the instance where the actual position of the carriage is B and the desired position is A. The letters associated with the waveforms in FIG. 7 are used to indicate the circuit locations in FIGS. 5 and 6 where these waveforms appear.

The four command signals having frequencies F–1, F–2, F–3, and F–4, represented by waveforms $a$, $c$, $e$ and $g$, respectively, are simultaneously fed into the four channels 19 to 22. At the same time, the four feedback signals having frequencies F–5, F–6, F–7 and F–8, represented by the waveforms $b$, $d$, $f$, and $h$, respectively, are simultaneously fed into these four channels 19 to 22. Each channel is designed to compare its two input signals and produce an error signal having characteristics that indicate the frequency relation between them. The construction and operation of fine channel 20, FIG. 5 and 6, which is similar to channels 21 and 22, will be discussed initially. It comprises a phasing and switching circuit 95 which includes two limiter circuits 96 and 97 connected to receive the command and feedback signals, respectively. A pair of switches 98 and 99 are connected to the outputs of the limiters 96 and 97, respectively, the switches 98 and 99 being under the control of a square wave generator 100. The generator 100 is preferably actuated by a 60 cycle line voltage which is first passed through a phasing circuit 101. As discussed in the applicant's copending U.S. Patent application, entitled, "System For Controlling A Structure According To A Predetermined Program Of Operation," Serial No. 736,177 filed May 19, 1958, the generator 100 causes the two switches 98 and 99 to alternately pass their input signals to a conductor 102 in synchronism with the line voltage. As shown by waveform $j$, FIG. 7, the command and feedback signals are alternately on the conductor 102 for sample periods of $\frac{1}{120}$ second in this instance. The switches 98 and 99 may be mechanical chopper switches, but electronic switches are preferred. The two limiters 96 and 97 clip the signal inputs to prevent overloading of the switches and spillover of one signal into the sample period of the other signal.

The output of the switching circuit 95 is fed into an amplifier and frequency comparator circuit 105, which includes an amplifier 106, a bistable multivibrator 107, a buffer amplifier 108 and a frequency measuring circuit 109. The amplifier 106 amplifies the incoming sampled signals to a level to ensure reliable triggering of the multivibrator 107, which duplicates with a square wave each cycle of the sampled signals. The multivibrator 107 output waveform is required to be of constant slope and amplitude only from one $\frac{1}{120}$ second in this instance sampling period to the next. The amplifier 108 stage prevents loading of the multivibrator 107 and furnishes sufficient drive for the circuit 109. The frequency measuring circuit 109 accomplishes a frequency to D.C. conversion by integrating the pulses fed into it. When the frequency, and consequently the number of square wave pulses, in the first $\frac{1}{120}$ second in this instance sample period is low as compared to the second period, the D.C. output voltage is also relatively low during the first period, and it rises during the second sample period when the frequency increases. As shown by waveform $n$, the result is a D.C. voltage having an A.C. component. The A.C. component has the same period as the line voltage and is either in phase or out of phase with the line voltage. When the two frequencies are identical, the output is a straight line, and when the frequency in the first sample period is relatively high the output voltage first rises and then falls. It is apparent, therefore, that the output voltage of the comparator circuit 105 has a peak-to-peak value that is proportional to the frequency difference between the feedback and command signals, and a phase that indicates which of these two signals has the higher frequency. The circuit 109 also contains a low pass filter section that passes the 60 cycle, for example, line component but alternates the command and feedback frequencies.

When a 60 cycle line reference voltage is used, a 120 cycle noise component in the form of pulses (not shown) will appear at the output of the comparator circuit 105 due to the operation of the switches 98 and 99. While this 120 cycle component cannot operate the type of actuator employed or directly introduce an error into the system, the 120 cycle noise can saturate the amplifiers and prevent the system from responding to a real error input when high gain is desired. To eliminate this 120 cycle component, a 120 cycle notch filter 110 is conected between the frequency comparator circuit 105 and the input to a phase reversal circuit 111.

The purpose of the phase reversal circuit 111 will be discussed subsequently. It comprises a phase splitting circuit 112 which produces two output signals, represented by waveforms $q$ and $r$, which are 180° out of phase. The two output signals are connected to two inputs of a switch 113 which is under the control of a bistable multivibrator 114. This multivibrator 114 is actuated by the switching circuit 57, FIG. 2, and causes the switch 113 to alternately pass one of the two outputs of the phase splitting circuit 112. When the cam actuated switch 60 is closed, one signal is passed by the switch 113 and when the switch 60 is open, the other signal having the opposite phase is passed.

The output of the phase reversal circuit 111 is connected to a variable gain amplifier 118, and to a wave shaping and phasing circuit 119. These circuits adjust the amplitude and improve the shape of the error signal output of the channel prior to its combination with the other error signals.

The coarse channel 19 includes a phasing and switching circuit 120, an amplifier and frequency comparator circuit 121, a filter circuit 122, a variable gain amplifier 123, and a wave shaping and phasing circuit 124, which are similar to the corresponding circuits 95, 105, 110, 118 and 119, respectively. It will be noted that the only substantial difference between channels 19 and 20 is the absence of a phase reversal circuit in channel 19. Fine channels 21 and 22 are also similar to channel 20, and their circuits are given the same reference numerals. The only difference in the corresponding circuits in the four channels are the values of some of the circuit components, the values for each channel being chosen to accommodate the frequency range employed. The feedback signals from the four oscillators 28, 31, 34 and 37, FIG. 2, are fed into the phasing and switching circuits 120 and 95 of the four channels 19 to 22, respectively, and the outputs of the three switching circuits 57, 58 and 59, FIG. 2, are fed into the phase reversal circuits 111 of the three channels 20, 21, and 22 respectively.

With reference to FIGS. 4 and 7, the command signal frequency F–1 of the coarse channel for desired position A is greater than the feedback signal frequency F–5 for actual position B. Since the switching circuit 120 places the command signal on its output conductor in the first sample period and then the feedback signal, as shown by waveform $i$, the output of the comparator circuit 121 rises during the first sample period and falls during the second as shown by waveform $m$. This signal is passed through the two circuits 123 and 124, and through an adding circuit 130 to an actuator 131. This actuator 131 is preferably a two-phase A.C. motor, having a control winding and a reference winding. The error signal from the adding circuit 130 is connected to the control winding and 60 cycle line voltage is connected to the reference winding. As is well known, when the A.C. component of the error signal is in phase with the line voltage the motor rotates in one direction and when they are out of phase it rotates in the other direction. When the A.C. component of the error signal on the control winding has zero magnitude the motor is stationary. Instead of an A.C. motor, any type of actuator may be employed that responds to this type of error signal, for example, a hydraulic pilot valve that is actuated by the suppressed carrier line frequency error signal. The actuator 131 is connected to operate a control 132 for the drive motor 15, FIG. 1, of the lathe lead screw such that the carriage is advanced when the phase of the control winding voltage is that of waveform $m$. It is apparent that if the coarse channel error signal alone were applied to the actuator 131, the carriage would be moved toward the desired position A, and that the magnitude of waveform $m$ would decrease as the actual position of the carriage approached the desired position.

The three fine channels 20 to 22 also produce error signals at position B but the variable gain amplifiers 118 and 123 are adjusted such that the magnitude of the coarse channel error signal is greater than the sum of the three fine channel error signals until the carriage is relatively close to the desired position. When three fine channels are used, the coarse channel error signal predominates until the carriage is within approximately $5\lambda/12$ of the desired position, $\lambda$ being the wavelength of one of the sine waves 92 to 94. Therefore, since the position B is farther from position A than the above distance the magnitude and phase of the three fine channel error signals do not influence the operation of the actuator circuit 131 at position B.

As the carriage moves along the bed from position B towards position A, the frequency of the feedback signal in each fine channel 20 to 22 varies while the frequency of the command signal of that channel remains constant. When the feedback signal frequency is less than the command signal frequency, the waveform of the voltage output of the comparator circuit of a channel first rises and then falls, as shown by waveforms $o$ and $p$ which are associated with curves 93 and 94 of channels 21 and 22, respectively. The phase of waveform $n$ shows the result when the feedback signal frequency is greater than the command signal frequency, as is the case at position B for channel 20, associated with curve 92, FIG. 4.

In each fine channel 20 to 22 the multivibrator 114, FIG. 6, is connected to cause the switch 113 to pass the one of its input error signals having the same phase as the output signal of the comparator circuit 105 when the actual position of the carriage coincides with a portion of the associated sine wave curves 92 to 94 having a positive slope. When the carriage coincides with a negative slope portion, the other input error signal of the switch 113 is passed. Actual position B, for example, coincides with positive slope portions of the curves 92 to 94 and, consequently, waveforms $w$, $x$ and $y$ are identical with waveforms $n$, $o$ and $p$ respectively.

Switching circuits 57, 58 and 59, FIG. 2 determine which of the two input signals of each switch 113 will be passed. In channel 20, for example, when cam switch 60 is closed multivibrator 114 is in one condition and causes switch 113 to pass the signal having waveform $q$, and when switch 60 is open the other input signal having waveform $r$ is passed. The position of the cam of switch 60 is adjusted such that it opens and closes in synchronism with the maximum and minimum frequency points on the curve 92, and is closed on positive slope portions of this curve and is open on negative slope portions. Switching circuits 58 and 59 similarly actuate the multivibrator 114 and the switch 113 of channels 21 and 22, respectively. The switches 113 in channels 21 and 22 are reversed in synchronism with the maximum and minimum frequency points of the two curves 93 and 94, respectively, which is accomplished by having the cam switches 61 and 62 open when the wipers of their associated potentiometers are at the terminals 50 and closed when diametrically opposed to the terminals 50. Since the potentiometer wipers in the tuning circuits 35 and 38 are angularly displaced relative to the wipers of tuning circuit 32 it is also necessary to displace the cams of switches 61 and 62 relative to the cam of switch 60.

Other means may be employed to switch the phase of the error signals of each fine channel before it reaches the adding circuit 130. For example, instead of the switching circuits 57 to 59 an electronic mechanism that senses direction of bed travel and change of feedback frequency could be used. Further, phase reversal of the error signals need not take place after the frequency comparator circuits 105. Switches for reversing the signal inputs to the switching circuits 95 would accomplish the same objective, for example.

As previously stated, the error signal of the coarse channel 19 predominates over the fine channel error signals at position B and moves the lathe carriage toward the desired position A. As the carriage moves along the bed toward the desired position, the course error signal does not change phase but its amplitude gradually reduces as the feedback signal frequency approaches the command signal frequency. The phase of each fine error signal, as well as its amplitude, changes as its feedback signal is alternately greater than and less than its command signal. As previously stated when the carriage is within approximately $5\lambda/12$ of the desired position the amplitude of the coarse error signal is within the range of the sum of the three fine error signals and they exert a controlling influence on the carriage position. Assume that the carriage has been moved to position C, FIG. 4, and that the oscillators 28, 31, 34 and 37 are generating feedback signals having frequencies F–9, F–10, F–11 and F–12 respectively. FIG. 8 is a schedule of waveforms for FIGS. 5 and 6 at actual position C and desired position A. In course channel 19 and fine channels 21 and 22 associated with curves 91, 93 and 94, respectively, the feedback signal frequency is less than the command signal frequency so that waveforms $m'$, $o'$ and $p'$ rise in the first sample period and then fall. Since the actual position C coincides with positive slope portions of curves 93 and 94, waveforms $x'$ and $y'$ are identical with waveforms $o'$ and $p'$, respectively. In fine channel 20, associated with curve 92, the feedback signal frequency F–10 is greater than the command signal frequency F–2, so waveform $n'$ first falls and then rises. Since position C coincides with a negative slope portion of curve 92 the waveform $w'$ passed by switch 113 has a phase opposite to that of waveform $n'$, but it has the same phase as waveforms $m'$, $x'$ and $y'$. The four waveforms $m'$, $w'$, $x'$ and $y'$ are fed to the adding circuit 130 (FIG. 5) and waveform z' (FIG. 8) represents the resultant error signal obtained by adding the four above-mentioned waveforms. This latter error signal energizes the actuator 131 and moves the carriage to a desired position A. At this position the resultant error signal is reduced in magnitude to zero because in each error detector channel the frequency difference between the command and feedback signals is reduced to zero.

It is apparent that, if it were desired to move the carriage to the left, for example from position A to position C, the system would accomplish this automatically by feeding command signals having frequencies F–9, F–10, F–11 and F–12 into the system. If a piece being machined on the lathe required a number of steps or operations, a point-to-point programming method could be used wherein a series of sets of command signals are prerecorded, each set of the series causing the carriage to move to the position associated with that set. A preferred method of programming is to have the command signal frequencies vary gradually. In this way, the desired position is constantly moving and the carriage may be led along the lathe bed. At each instant the desired position may be at such a distance from the actual position of the carriage that either the coarse channel error signal controls carriage movement or the three fine channel error signals control the movement.

From the foregoing description, it is apparent that the coarse channel with its transducer comprises means responsive to a command signal for moving the carriage adjacent to a desired position and the fine channels with their transducers then assume control and bring the carriage exactly to this position. The slope, or derivative, of each fine channel curve 92 to 94 is greater throughout its major portion than the slope of coarse channel curve 91, so that for a given distance between the desired and actual carriage positions, the frequency difference will generally be greater in each fine channel than in the coarse channel. The error signal for the fine channels will of course be less than the coarse channel error signal when the carriage is at a point remote from the desired position because of the setting of the variable gain amplifiers 118 and 123. As the carriage approaches the desired position, the coarse channel error signal decreases relative to the fine channel error signals.

More than one fine channel is preferable for proper operation. If only one fine channel were used and the desired position were close to or coincided with a maximum or minimum frequency point on the frequency-carriage travel curve, for the one fine channel accurate positioning would not be obtained because the curve is substantially flat in these areas. Because of such flatness, the frequency change in such area would be too small to provide a sufficient error signal. The use of a second channel offset somewhat in phase as shown in FIG. 4 removes this difficulty. A third or even more fine frequency channels may be used to further increase the system accuracy and reduce the ratio of error signal to random signal noise in the frequency comparator channels brought on by switching transients. A further advantage in using three fine frequency channels rather than two is because three fine frequency channels alone, without the coarse channel, will produce a satisfactory, in terms of phase and amplitude, resultant error signal up to approximately $5\lambda/12$ of the sine wave, whereas two fine frequency channels will produce a satisfactory resultant error signal up to approximately $\lambda/4$. This determines the distance from the desired position at which the coarse channel error signal assumes or relinquishes control of the carriage.

It is not necessary that each channel have a different frequency band as shown in FIG. 4. The same frequency value could be used in more than one channel if a multi-track recording system were used to keep the channel separate. When each channel is assigned its own frequency band, as in the system described, all command signals may be recorded on a single track and band pass filters may be used to separate the signals. The filters could of course be eliminated and a multi-track recording system employed.

When the system described is employed to control the position of the carriage of the lathe, many machining operations will require that a second system of this character be provided to control the operation of the cross feed. In these circumstances, means, such as recording all command signals on a single tape, will be provided to synchronize the command signals of the two systems. Also, a set of standby oscillators may be provided to feed substitute control signals into the system in the event of a malfunction, such as a broken tape, to prevent the machine from running out of control.

While the function of frequency and carriage travel has been described as linear for the coarse feedback transducer and sinusoidal for the three fine feedback transducers, it is apparent that other functions or curves could be employed. The function for the coarse transducer could be a downwardly sloping straight line or it could be a curve having a gradually changing slope. However, the sign of the slope, or derivative, should not change. A known linear function is preferable to other types since it simplifies programming. When the curves of the fine feedback transducers vary cyclically they must be monotonic within the intervals or cycles and the derivative of such functions or curves must not change sign or remain at zero for more than a finite number of points within the interval or cycle. Nevertheless, it is preferable to have the frequency be a mathematical function of distance along the lathe bed, for example, a sine wave or a triangular wave, to make programming easier. If a curve should vary in an irregular manner, programming by any method other than first making a part on the machine and recording the motions using the feedback transducers would be difficult.

While the system has been illustrated and described as an automatic control for the carriage of a lathe, it will be apparent that the system could be used to control any variable parameter. The transducers need only to be connected so that they are responsive to the condition or status of the parameter, and the actuator connected to change the condition or status in such a manner as to eliminate any error signal.

I claim:

1. A system for controlling a variable parameter, comprising a coarse feedback transducer, two fine feedback transducers, each transducer being adapted to be responsive to the parameter being controlled and to generate an electrical feedback signal whose frequency varies with changes of the parameter, the frequency of each of said fine feedback transducers varying with change of the parameter throughout the major portion of its variations at a more rapid rate than the frequency of said coarse feedback transducer, a coarse error detector channel connected to the output of said coarse feedback transducer, a fine error detector channel connected to the output of each of said fine feedback transducers, each of said channels also having an input adapted to receive a command signal with a frequency having a predetermined relation to the frequency of the feedback signal for that channel for a desired condition of the parameter, each of said channels being adapted to produce an error signal having characteristics that are representative of the frequency relation between its command and feedback signals, actuator means responsive to said error signals for varying said parameter to cause its actual condition to coincide with said desired condition, said coarse frequency transducer being constructed such that the derivative of its frequency-parameter curve always has the same sign, and each of said fine frequency transducers being constructed such that the sign of the derivative of its frequency-parameter curve changes, the derivatives of the frequency-parameter curves of said fine feedback transducers changing sign at different times; said characteristics of each error signal comprising its phase and magnitude, the phase indicating whether the feedback signal or the command signal has the higher frequency and the magnitude indicating the extent of the frequency difference, and each fine error detector channel including means for reversing the phase of its error signal each time the derivative of its associated frequency-parameter curve changes sign.

2. A system as in claim 1, said reversing means for each fine error detecting channel reversing the phase of the error signal of each channel to bring it into a predetermined relation with the phase of the error signal of the coarse error detector channel, and said predetermined relation being such that when said parameter approaches the desired condition the phase of the error signal of each fine error detector channel is the same as the phase of the error signal of the coarse error detector channel.

3. A system for controlling a variable parameter, comprising a coarse feedback transducer, at least one fine feedback transducer, each transducer being adapted to be responsive to the parameter being controlled and to generate an electrical feedback signal whose frequency varies with change of the parameter, the frequency of said fine feedback transducer varying with change of the parameter throughout the major portion of its variations at a more rapid rate than the frequency of said coarse feedback transducer, a coarse error detector channel connected to the output of said coarse feedback transducer, a fine error detector channel connected to the output of said fine feedback transducer, each of said channels also having an input adapted to receive a command signal with a frequency having a predetermined relation to the freuency of the feedback signal for that channel for a desired condition of the parameter, each of said channels being adapted to produce an error signal having characteristics that are representative of the frequency relation between its command and feedback signals, actuator means responsive to said error signals for varying said parameter to cause its actual condition to coincide with said desired condition, each of said transducers comprising a variable oscillator having a tuning network, said tuning network comprising a first inductor, two series connected variable resistors connected in parallel across said first inductor, and a second inductor having one end connected to and between said two variable resistors, the two ends of said first inductor and the other end of said second inductor being connected into the remainder of the circuit of said oscillator, said two variable resistors being adapted to be varied as the parameter changes.

4. A system as in claim 3, wherein said two variable resistors are equal, and the frequency of each oscillator varies substantially linearly with variation of said resistors, said two variable resistors for said fine feedback transducer being rotary potentiometers, the resistance of each of said potentiometers varying as a sine wave as it is rotated, whereby the frequency of said fine feedback transducer varies as a sine wave with variation of the parameter, and said two variable resistors for said coarse feedback transducer are movable linearly, the resistance of each of said last-mentioned resistors varying as a straight line as they are moved, whereby the frequency of said coarse feedback transducer varies linearly, and said characteristics of each error signal comprising its phase and magnitude, the phase indicating whether the command or feedback signal of that channel has the higher frequency and the magnitude indicating the extent of the frequency difference, and said fine error detector channel including means for reversing the phase of its error signal each time the frequency of said fine feedback transducer is at a maximum and a minimum value, said phase reversing means being connected to operate in timed relation with said rotary potentiometers.

5. A system for controlling a variable parameter, comprising a coarse feedback transducer, at least one fine feedback transducer, each transducer being adapted to be responsive to the parameter being controlled and to generate an electrical feedback signal whose frequency varies with change of the parameter throughout substantially the entire range of variation of the parameter, the frequency of said fine feedback transducer varying with change of the parameter throughout the major portion of its variations at a more rapid rate than the frequency of said coarse feedback transducer, a coarse error detector channel connected to the output of said coarse feedback transducer, a fine error detector channel connected to the output of said fine feedback transducer, each of said channels also having an input adapted to receive a command signal with a frequency having a predetermined relation to the frequency of the feedback signal for that channel for a desired condition of the parameter, each of said channels being adapted to produce an error signal having characteristics that are representative of the frequency relation between its command and feedback signals, actuator means responsive to said error signals for varying said parameter to cause its actual condition to coincide with said desired condition, adding means connected between said channels and said actuator means, said adding means combining said error signals and producing a resultant error signal that drives said actuator means.

6. A system for controlling the position and movement of a movably mounted structure, comprising a coarse and at least two fine feedback transducers, each transducer being adapted to be responsive to the position of the structure and generate a feedback signal whose frequency is a function of the position of the structure, the derivative of the function for each fine transducer throughout the major portion of said function being greater than the derivative of the function for said coarse transducer, a coarse error detector channel connected to the output of said coarse feedback transducer and a fine error detector channel connected to the output of each of said fine feedback transducers, each of said channels also being adapted to receive a command signal, the frequency of the command signal for each channel being equal to the frequency of the feedback signal for that channel at a desired position of the structure, each of said channels producing an error signal having characteristics that are representative of the frequency relation between its command and feedback signals when the actual position is other than the desired position, adding means connected to the output of each of said channels for combining said error signals to produce a resultant error signal, and actuator means responsive to said adding means and adapted to vary the position of the structure to cause its actual position to coincide with said desired position and thereby eliminate said resultant error signal.

7. A system as in claim 6, wherein the frequency of the feedback signal of each of said fine transducers varies as the structure moves through its range of movement, the rate of variation of frequency changing so that the derivative of the frequency-position function for each of said fine transducers also changes with movement of the structure, the derivative of said frequency-position function for said coarse transducer being substantially constant, and the derivative of said function for each of said fine transducers changing sign at least twice as the structure moves through its range of movement, and the function being monotonic between the points where its derivative changes sign, said characteristics being the phase and magnitude of each error signal, the phase indicating whether the feedback or command signal for each channel has the higher frequency and the magnitude indicating the extent of the frequency difference, and each of said fine error detector channels including means for reversing the phase of its associated error signal each time said derivative of its associated frequency-position function changes sign whereby said error signals are of proper phase for adding.

8. A system for controlling the position and movement of a movably mounted structure, comprising a coarse and first, second and third fine feedback transducers, each transducer being adapted to be responsive to the position of the structure and generate a feedback signal whose frequency is a function of the position of the structure, recording means having recorded thereon a coarse and first, second and third fine command signals having frequencies which are identical with the frequencies of said feedback signals of the respective coarse and fine feedback transducers, at a desired position, a coarse, and first, second and third fine error detector channels respectively connected to receive said coarse and first, second and third fine command signals and the feedback signals of said coarse and first, second and third fine feedback transducers, each of said channels being adapted to compare the signals received thereby and to produce an error signal having characteristics representative of the frequency relation between the signals, adding means connected to said channels for combining the error signals to produce a resultant error signal, and actuator means responsive to said resultant error signal and adapted to vary the position of the structure in such a manner as to eliminate said resultant error signal by causing the actual position of the structure to coincide with said desired position.

9. A system as in claim 8, wherein the frequency-position function for said coarse feedback transducer is substantially linear, and the frequency-position function for each of said fine feedback transducers is a mathematical function, said mathematical function being a sine wave and said functions for said fine feedback transducers being identical.

10. A system for controlling a variable parameter, comprising means responsive to a command signal for varying the parameter to bring it to a condition adjacent a desired condition, at least one fine feedback transducer, said transducer being adapted to be responsive to the parameter being controlled and to generate an electrical feedback signal whose frequency varies with change of the parameter, a fine error detector channel connected to the output of said fine feedback transducer, said transducer also being adapted to receive a command signal whose frequency is equal to the frequency of said feedback signal at said desired condition, said channel producing an error signal having characteristics that are representative of the frequency relation between its command and error signals when the actual condition of the parameter is adjacent the desired condition, actuator means responsive to said error signal for varying said parameter to eliminate said error signal and thereby cause its actual condition to coincide with said desired condition, said transducer being constructed such that the frequency of said feedback signal varies in accordance with a predetermined function as the structure moves through its range of movement, the rate of variation of frequency changing so that the derivative of said function also changes with movement of the structure, and the derivative of said function changes sign at least twice and thus has both positive and negative portions, said characteristics of said error signal comprising its phase and its magnitude, the phase indicating whether the feedback signal or the command signal has the higher frequency and the magnitude indicating the extent of the frequency difference, said actuator means being responsive to said phase of said error signal such that said phase determines the direction in which said parameter is thereby varied, and said error detector channel including means for reversing the phase of said error signal, said phase reversing means causing the signal received by said actuating means to have a phase such that said actuating means always varies said parameter toward said desired condition when said parameter is adjacent said desired condition.

11. A system for controlling a variable parameter, comprising means responsive to a command signal for varying the parameter to bring it a condition adjacent a desired condition, at least one fine feedback transducer, said transducer being adapted to be responsive to the parameter being controlled and said fine frequency transducer generating an electrical feedback signal whose frequency varies with change of the parameter throughout the range of variation of the parameter, a fine error detector channel connected to the output of said fine feedback transducer, said channel also being adapted to receive a command signal whose frequency is equal to the frequency of said feedback signal at said desired condition, said channel producing an error signal having characteristics that are representative of the frequency relation between its command and error signals when the actual condition of the parameter is adjacent the desired condition, actuator means responsive to said error signal for varying said parameter to eliminate said error signal and thereby cause its actual condition to coincide with said desired condition, a second fine feedback transducer and a second fine error detector channel, said second fine error detector channel being connected to the output of said second fine feedback transducer and being adapted to receive a command signal whose frequency is equal to the frequency of the feedback signal of said second fine feedback transduecr at said desired condition, and further including adding means connected to receive said error signals from said channels and combine them to produce a resultant error signal which drives said actuating means.

12. A system for controlling a variable parameter, comprising means responsive to a command signal for varying the parameter to bring it to a condition adjacent a desired condition, at least one fine feedback transducer, said transducer being adapted to be responsive to the parameter being controlled and to generate an electrical feedback signal whose frequency varies with change of the parameter, a fine error detector channel connected to the output of said fine feedback transducer, said transducer also being adapted to receive a command signal whose frequency is equal to the frequency of said feedback signal at said desired condition, said channel producing an error signal having characteristics that are representative of the frequency relation between its command and error signals when the actual condition of the parameter is adjacent the desired condition, actuator means responsive to said error signal for varying said parameter to eliminate said error signal and thereby cause its actual condition to coincide with said desired condition, said transducer comprising a variable oscillator having a tuning network, said tuning network comprising a first inductor, two series connected rotary potentiometers connected in parallel across said first inductor, and a second inductor having one end connected to and between said two potentiometers, the two ends of said first inductor and the other end of said second inductor being connected into the remainder of the circuit of said oscillator said two potentiometers being adapted to be rotated as the parameter changes.

13. A system as in claim 12, wherein the feedback signal generated by each of said fine feedback transducers is a sine wave function of said parameter and said characteristics of said error signal comprise its phase and magnitude, the phase indicating whether the feedback signal or the command signal for said error detector channel has the higher frequency and the magnitude indicating the extent of the frequency difference, and said error detector channel includes for reversing said phase of said error signal in timed relation with the maximum and minimum points of said sine wave.

14. A system for controlling a variable parameter, comprising a coarse feedback transducer, at least one fine feedback transducer, each transducer being adapted to be responsive to the parameter being controlled and to generate an electrical feedback signal whose frequency varies with change of the parameter, the frequency of said fine feedback transducer varying with change of the parameter throughout the major portion of its variations at a more rapid rate than the frequency of said coarse feedback transducer, a coarse error detector channel connected to the output of said coarse feedback transducer, a fine error detector channel connected to the output of said fine feedback transducer, each of said channels also having an input adapted to receive a command signal with a frequency haivng a predetermined relation to the frequency of the feedback signal for that channel for a desired condition of the parameter, each of said channels being adapted to produce an error signal having characteristics that are representative of the frequency relation between its command and feedback signals, actuator means responsive to said error signals for varying said parameter to cause its actual condition to coincide with said desired condition, said system being in combination with a linearly movable carriage and a rotatable lead screw for moving said carriage, wherein said coarse feedback transducer is connected to and is responsive to the linear movement of said carriage, and said fine feedback transducer is connected to and is responsive to the rotary movement of said lead screw, and said actuator has a rotating driving connection with said lead screw.

15. A system for controlling a variable parameter, comprising a coarse feedback transducer, at least one fine feedback transducer, each transducer being adapted to be responsive to the parameter being controlled and to generate an electrical feedback signal whose frequency varies with change of the parameter, the frequency of said fine feedback transducer varying with change of the parameter throughout the major portion of its variations at a more rapid rate than the frequency of said coarse feedback transducer, a coarse error detector channel connected to the output of said coarse feedback transducer, a fine error detector channel connected to the output of said fine feedback transducer, each of said channels also having an input adapted to receive a command signal with a frequency having a predetermined relation to the frequency of the feedback signal for that channel for a desired condition of the parameter, each of said channels being adapted to produce an error signal having characteristics that are representative of the frequency relation between its command and feedback signals, actuator means responsive to said error signals for varying said parameter to cause its actual condition to coincide with said desired condition, each of said transducers comprising variable oscillator having a tuning network, said tuning network comprising a first inductor, two series connected variable resistors connected in parallel across said first inductor, and a second inductor having one end connected to and between said two variable resistors, the two ends of said first inductor and the other end of said second inductor being connected into the remainder of the circuit of said oscillator, said two variable resistors being adapted to be varied as the parameter changes, said two variable resistors being equal, and the frequency of each oscillator varying substantially linearly with variation of said resistors, said two variable resistors for said fine feedback transducer being rotary potentiometers, the resistance of each of said potentiometers varying as a sine wave as it is rotated, whereby the frequency of said fine feedback transducer varies as a sine wave with variation of the parameter, and said two variable resistors for said coarse feedback transducer being movable linearly, the resistance of each of said last-mentioned resistors varying as a straight line as they are moved, whereby the frequency of said coarse feedback transducer varies linearly, said characteristics of each error signal comprising its phase and magnitude, the phase indicating whether the command or feedback signal of that channel has the higher frequency and the magnitude indicating the extent of the frequency difference, and said fine error detector channel including means for reversing the phase of its error signal each time the frequency of said fine feedback transducer is at a maximum and a minimum value, said phase reversing means being connected to operate in timed relation with said rotary potentiometers, and said phase reversing means including a rotary cam actuated switch connected to be rotated with said rotary potentiometers, in combination with a linearly movable carriage and a rotatable lead screw for moving said carriage, wherein said two variable resistors for said coarse feedback transducers are connected to and are responsive to the movement of said carriage, said two rotary potentiometers for said fine feedback transducers are connected to and are responsive to the rotation of said lead screw, said rotary cam actuated switch is operated by a cam connected to and responsive to the rotation of said lead screw, and said actuator has a driving connection with said lead screw.

16. The method of operating a machine tool having a linearly movable carriage and a rotatable lead screw for driving the carriage, comprising sensing the actual position of the carriage and generating a coarse feedback signal whose frequency varies substantially linearly with carriage travel, sensing the actual rotative position of the lead screw and generating three fine feedback signals whose frequencies vary as a sine wave with rotation of the lead screw, said three fine feedback signals respectively being at a maximum and minimum frequency values at different points, comparing the frequency of said coarse feedback signal, with the frequency of a coarse command signal and generating a course error signal, comparing the frequency of each of said fine feedback signals with the frequency of a fine command signal and generating three fine error signals, each of said coarse and three fine error signals having a phase and magnitude which is indicative of the frequency difference between its associated command and feedback signals, reversing the phase of each of said fine error signals, each time its associated fine feedback signal is at a maximum or minimum frequency value, combining said coarse and three fine error signals to produce a resultant error signal, and rotating said lead screw in response to said resultant error signal in a direction tending to eliminate said resultant error signal.

References Cited by the Examiner
UNITED STATES PATENTS

| | | | |
|---|---|---|---|
| 2,395,708 | 2/1946 | Alexanderson | 318—28 |
| 2,632,871 | 3/1953 | Erickson | 318—28 |
| 2,978,620 | 4/1961 | Schlattner | 218—28 |
| 3,040,221 | 6/1962 | Fitzner | 218—162 |

ORIS L. RADER, *Primary Examiner.*

T. LYNCH, *Assistant Examiner.*